(12) United States Patent
Lee et al.

(10) Patent No.: US 8,730,420 B2
(45) Date of Patent: May 20, 2014

(54) LIQUID CRYSTAL DISPLAY

(75) Inventors: Woo-Geun Lee, Yongin-si (KR);
Shi-Yul Kim, Yongin-si (KR);
Jae-Hyoung Youn, Seoul (KR);
Young-Wook Lee, Suwon-si (KR)

(73) Assignee: Samsung Display Co., Ltd. (KR)

( * ) Notice: Subject to any disclaimer, the term of this patent is extended or adjusted under 35 U.S.C. 154(b) by 35 days.

(21) Appl. No.: 13/419,228

(22) Filed: Mar. 13, 2012

(65) Prior Publication Data
US 2012/0194414 A1 Aug. 2, 2012

Related U.S. Application Data

(63) Continuation of application No. 12/152,619, filed on May 14, 2008, now Pat. No. 8,144,280.

(30) Foreign Application Priority Data

Jul. 30, 2007 (KR) ........................ 10-2007-0076195

(51) Int. Cl.
*G02F 1/136* (2006.01)
*G02F 1/1343* (2006.01)

(52) U.S. Cl.
USPC ................................ 349/44; 349/38; 349/139

(58) Field of Classification Search
USPC ........................................ 349/38–39, 44, 139
See application file for complete search history.

(56) References Cited

U.S. PATENT DOCUMENTS

| 7,639,333 | B2 | 12/2009 | Do et al. |
| 7,688,417 | B2 | 3/2010 | Kim et al. |
| 7,760,282 | B2 | 7/2010 | Lee et al. |
| 2005/0036091 | A1 | 2/2005 | Song |
| 2008/0068550 | A1 | 3/2008 | Chang et al. |

FOREIGN PATENT DOCUMENTS

JP 2005-062882 10/2005

*Primary Examiner* — Eric Wong
(74) *Attorney, Agent, or Firm* — Innovation Counsel LLP

(57) ABSTRACT

A liquid crystal display to prevent light leakage with an improvement of aperture ratio and a reduction of load of a data line is provided. The liquid crystal display includes a gate line and a storage electrode line formed on a insulating substrate and apart from each other, a first data line and a second data line intersecting the gate line, a first pixel electrode defined by the gate line and the first data line, and a second pixel electrode defined by the gate line and the second data line and neighboring the first pixel electrode. Also, a blocking electrode between the first pixel electrode and the second pixel electrode is included, wherein at least portion of the first data line is disposed under the first pixel electrode, and at least portion of the blocking electrode is disposed under the second pixel electrode and apart from the first data line.

23 Claims, 17 Drawing Sheets

LIQUID CRYSTAL DISPLAY

CROSS-REFERENCE TO RELATED APPLICATION

This is a continuation application of U.S. patent application Ser. No. 12/152,619, filed May 14, 2008, which application claims priority to and the benefit of Korean Patent Application No. 10-2007-0076195 filed in the Korean Intellectual Property Office on Jul. 30, 2007, the entire contents of which applications are hereby incorporated herein by their references.

BACKGROUND OF THE INVENTION (a) Field of the Invention

The present invention relates to a liquid crystal display.

(b) Description of the Related Art

A liquid crystal display includes a common electrode panel having a common electrode, and a thin film transistor array panel having a thin film transistor array. The common electrode panel and the thin film transistor array panel face to each other and are combined to each other by a seal line formed between the two panels, and a liquid crystal layer is formed in the space therebetween. This liquid crystal display including the two panels is provided with field-generating electrodes, and the liquid crystal layer interposed therebetween, and displays images by applying voltages to the field-generating electrodes to generate an electric field in the liquid crystal layer that determines the orientations of liquid crystal molecules therein to control the amount of transmitted light.

Because the liquid crystal display is a non-emissive device, a backlight unit for providing the light on the rear of the thin film transistor array panel is provided. On the other hand, a reflector may be disposed on the thin film transistors for using light that is incident from the outside on the thin film transistor panel. The amount of transmittance of light that is irradiated by a backlight or incident from the outside is controlled according to the arrangement of the liquid crystal molecules.

The thin film transistor array panel includes a plurality of gate lines, data lines, and pixel electrodes. The gate lines extend in the row direction and transmit gate signals, and the data lines extend in the column direction and transmit data signals. The pixels are connected to the gate lines and the data lines, and to a plurality of switching elements and storage capacitors.

Here, the switching elements are disposed at portions where the gate lines and the data lines intersect each other, and each switching element is a three terminal element including a control terminal connected to a gate line, an input terminal connected to a data line, and an output terminal connected to a pixel electrode. The output terminal of each switching element is connected to the storage capacitor and the liquid crystal capacitor.

In the case of the general liquid crystal display, the pixel electrodes are disposed on the data lines to improve the aperture ratio, and a low dielectric organic layer is formed between the pixel electrodes and the data lines to reduce parasitic capacitance generated therebetween.

However, there is a limitation in reducing the parasitic capacitance by using the low dielectric organic layer. Particularly, because the liquid crystal display is adjusted to line inversion driving or dot inversion driving, opposite voltages are applied to neighboring pixel electrodes. Accordingly, when the data lines are disposed under the pixel electrodes to improve the aperture ratio, if a difference between the potential of pixel electrodes disposed on both sides of a data line and the voltage applied to the data line is increased, the parasitic capacitance generated by the coupling effect between the data line and the pixel electrodes is particularly increased. Typically, a greenish phenomenon occurs. This is a defect in which the gamma values of the yellow colors are decreased when the yellow-based color is displayed on the entire screen such that green colors appear. This depends on differences between the voltage applied to the data line and the substantial pixel voltage due to the increase of a load of the data line according to the parasitic capacitance.

Furthermore, a black matrix is disposed on the common electrode panel corresponding to the data lines to prevent light leakage generated at the edge of the data lines. Light emitted from a backlight disposed under the thin film transistor array panel is incident to the data lines with diverse angles and is reflected by the data lines at a large angle such that the light leakage is generated. To prevent the light leakage, it is necessary to increase the area of the black matrix. However, if the area of the black matrix is increased, the aperture ratio of the liquid crystal display is decreased and the light leakage is reduced, but the luminance of the liquid crystal display is reduced.

The above information disclosed in this Background section is only for enhancement of understanding of the background of the invention and therefore it may contain information that does not form the prior art that is already known in this country to a person of ordinary skill in the art.

SUMMARY OF THE INVENTION

The technical object of the present invention is to provide a liquid crystal display in which light leakage is prevented, as well as to increase the aperture ratio and to reduce loads of the data lines and the data driving ICs, by forming a blocking electrode on the edges of the data lines to reduce parasitic capacitance generated by the coupling effect between the data lines and the pixel electrodes.

Technical objects of the present invention are limited by the above described technical object, and the technical objects that are described will be clearly comprehended by a person of ordinary skill in the art.

A liquid crystal display according to an exemplary embodiment of the present invention includes a gate line and a storage electrode line formed on an insulating substrate and apart from each other, a first data line and a second data line intersecting the gate line, a first pixel electrode defined by the gate line and the first data line, and a second pixel electrode defined by the gate line and the second data line and neighboring the first pixel electrode. Also, a blocking electrode between the first pixel electrode and the second pixel electrode is included, wherein at least a portion of the first data line is disposed under the first pixel electrode and at least a portion of the blocking electrode is disposed under the second pixel electrode and apart from the first data line.

A liquid crystal display according to an exemplary embodiment of the present invention includes a gate line formed on a substrate, a storage electrode line formed on the substrate and separated from the gate line, a first data line and a second data line insulated from the gate line and the storage electrode line and intersecting the gate line, a first pixel electrode disposed in a region defined by the gate line and the first data line, a first thin film transistor connected to the gate line, the data line, and the first pixel electrode, a second pixel electrode disposed in a region defined by the gate line and the second data line and neighboring the first pixel electrode, a color filter formed on the insulating substrate, a light blocking member formed on the first thin film transistor, and a blocking electrode formed between the first pixel electrode and the second pixel electrode neighboring the first pixel electrode, wherein at least a portion of the first data line is disposed under the first pixel electrode and at least a portion of the blocking electrode is disposed under the second pixel electrode and apart from the data line.

DETAILED DESCRIPTION OF THE EMBODIMENTS

Figure 1:
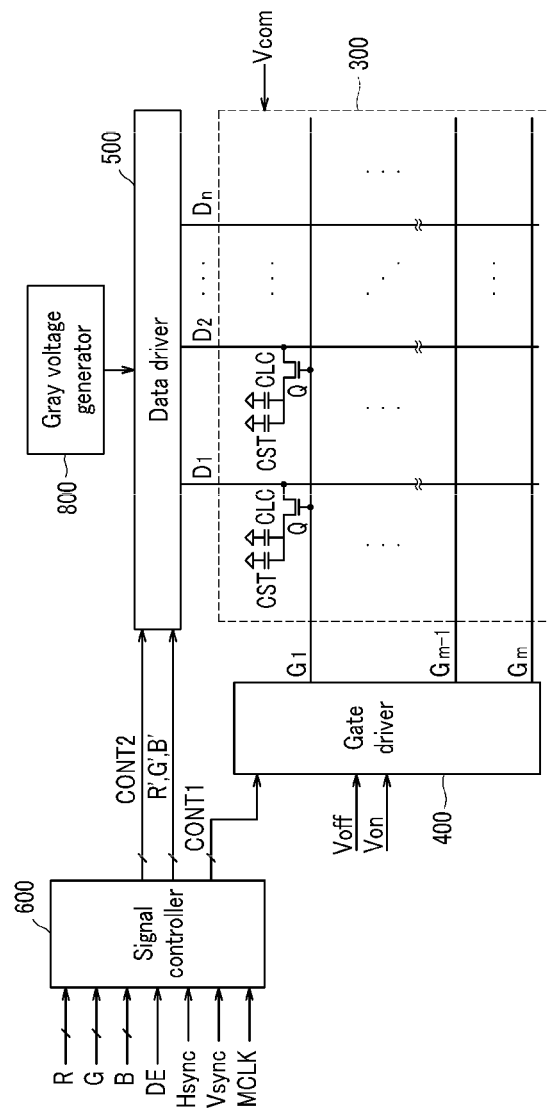
FIG. 1 is a block diagram of a liquid crystal display according to an exemplary embodiment of the present invention.

The advantages and characteristics of the present invention and means for achieving them will become apparent from the following detailed description of the exemplary embodiments and the accompanying drawings. However, the present invention is not limited by the hereafter disclosed exemplary embodiments, but may be modified in various different ways. The present exemplary embodiments provide complete disclosure of the present invention and complete information of the scope of the present invention to those skilled in the art, and the present invention is defined by the scope of the claims.

In the drawings, the thickness of layers, films, panels, regions, etc., are exaggerated for clarity, and like reference numerals designate like elements throughout the specification.

It will be understood that when an element such as a layer, film, region, or substrate is referred to as being "on" another element, it can be directly on the other element or intervening elements may also be present.

In contrast, when an element is referred to as being "directly on" another element, there are no intervening elements present.

Now, a liquid crystal display according to an exemplary embodiment of the present invention will be described in detail with reference to the drawings.

A liquid crystal display according to the present invention includes a thin film transistor array panel having a thin film transistor connected to a gate line and a data line, a common electrode panel having a common electrode, and a liquid crystal layer formed between the thin film transistor array panel and the common electrode panel. The longitudinal axes of liquid crystal molecules of the liquid crystal layer are vertically or horizontally aligned with respect to the display panels.

As shown in FIG. 1, a liquid crystal display according to an exemplary embodiment of the present invention includes a liquid crystal panel assembly 300, a gate driver 400, a data driver 500, a gray voltage generator 800, and a signal controller 600.

The liquid crystal panel assembly 300 includes a plurality of signal lines G1 to Gm and D1 to Dn and a plurality of pixels PX that are connected to the plurality of signal lines and arranged in a matrix form. The signal lines G1 to Gm and D1 to Dn include a plurality of gate lines G1 to Gm for delivering gate signals (also referred to as scan signals) and a plurality of data lines D1 to Dn for delivering data signals. The gate lines G1 to Gm extend in an approximate row direction and are generally parallel to each other, and the data lines D1 to Dn extend in a column direction and are generally parallel to each other.

Each pixel includes a switching element Q that is connected to one each of signal lines G1-Gm and D1-Dn, a liquid crystal capacitor CLC that is connected to the switching element Q, and a storage capacitor CST. The storage capacitor CST is optional.

The switching element Q may be a three-terminal element and may be provided in the thin film transistor array panel (not shown). The switching element Q has a control terminal connected to the gate lines G1-Gm, an input terminal connected to the data lines D1-Dn, and an output terminal connected to the liquid crystal capacitor CLC and the storage capacitor CST.

The liquid crystal capacitor CLC uses a pixel electrode of the thin film transistor array panel and a common electrode of the common electrode panel (not shown) as two terminals. A liquid crystal layer between the two electrodes functions as a dielectric material. The pixel electrode is connected to the switching element Q, and the common electrode which is supplied with a common voltage Vcom is formed on the whole surface of the common electrode panel. The common electrode may be provided in the thin film transistor array panel. In this case, at least one of the two electrodes may have a linear or bar shape.

The storage capacitor Cst, which serves to assist the liquid crystal capacitor Clc, includes a storage electrode line (not shown) provided in the thin film transistor array panel, and a pixel electrode or the output terminal of the switching element Q, which are overlapped with an insulator therebetween. The storage electrode line is supplied with a given voltage such as the common voltage Vcom. In the storage capacitor Cst, however, the pixel electrode may be overlapped with a previous gate line through the intermediation of the insulator.

Figure 2:
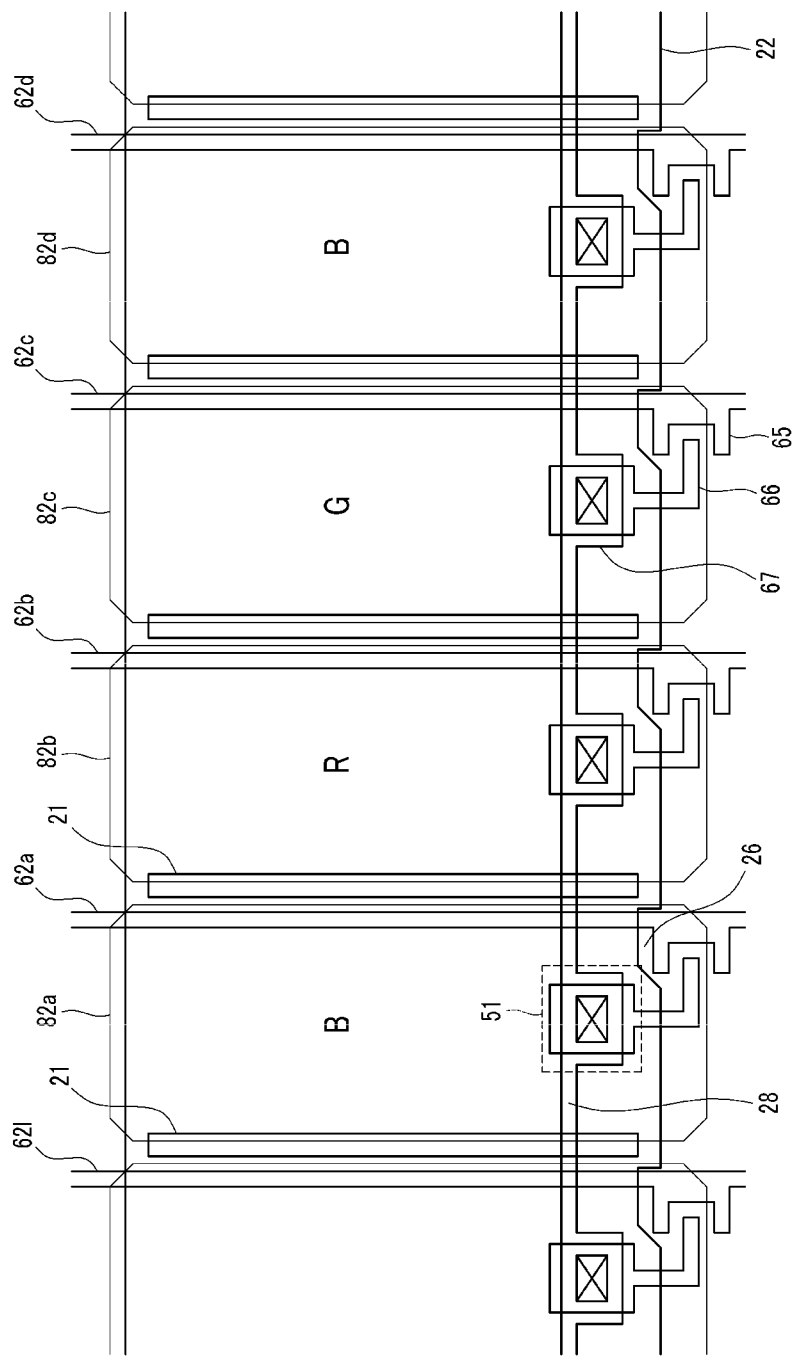
FIG. 2 is a layout view of a thin film transistor array panel according to an exemplary embodiment of the present invention.

Referring to FIGS. 2 to 4, a thin film transistor array panel according to the present invention is described below in detail.

FIG. 2 is a layout view of a thin film transistor array panel according to an exemplary embodiment of the present invention.

Referring to FIG. 2, a thin film transistor array panel according to the present exemplary embodiment includes a gate line 22, data lines 62a-62d, drain electrodes 66, blocking electrodes 21, a storage electrode line 28, and pixel electrodes 82a-82d. The gate line 22 includes gate electrodes 26, the data lines 62a-62d include source electrodes 65, and the storage electrode line 28 includes storage electrodes 67.

FIG. 2 shows reference characters such as "a", "b", "c", and "d," which are added to the reference numbers. The elements referred by the reference characters "a", "b", "c", and "d" are indicated by the ordinal numbers of first, second, third, and fourth, respectively. Also, the reference numerals B, R, and G respectively indicate colors of blue, red, and green, and these colors are created by color filters (not shown) that occupy essentially the same areas that are occupied by the pixel electrodes 82a-82d.

Each of the pixel electrodes 82a-82d is supplied with signal voltages, i.e., data voltages from the data driver 500 and the gate driver 400 to display desired images. Adjacent pixel electrodes 82a-82d are supplied with data voltages having opposite polarities relative to a common voltage. The data voltages are supplied from the data lines 62a-62d when the thin film transistors that function as switches are turned on in synchronization with the gate signals from the gate line 22.

Each of the pixel electrodes 82b-82d may be spaced apart from a data line 62a-62c that is disposed on its left side, and may completely cover a data line 62a-62c that is disposed on its right side.

The blocking electrodes 21 are substantially parallel to the data lines 62a-62d, and are spaced apart from the data lines 62a-62d. Each of the blocking electrodes 21 is disposed between two data lines 62a-62d and close to the left one. In addition, each of the blocking electrodes 21 is disposed between two pixel electrodes 82a-82d and spaced apart from the left one while partly overlapping the right one. However, the left side and the right side may be exchanged.

Figure 3A:
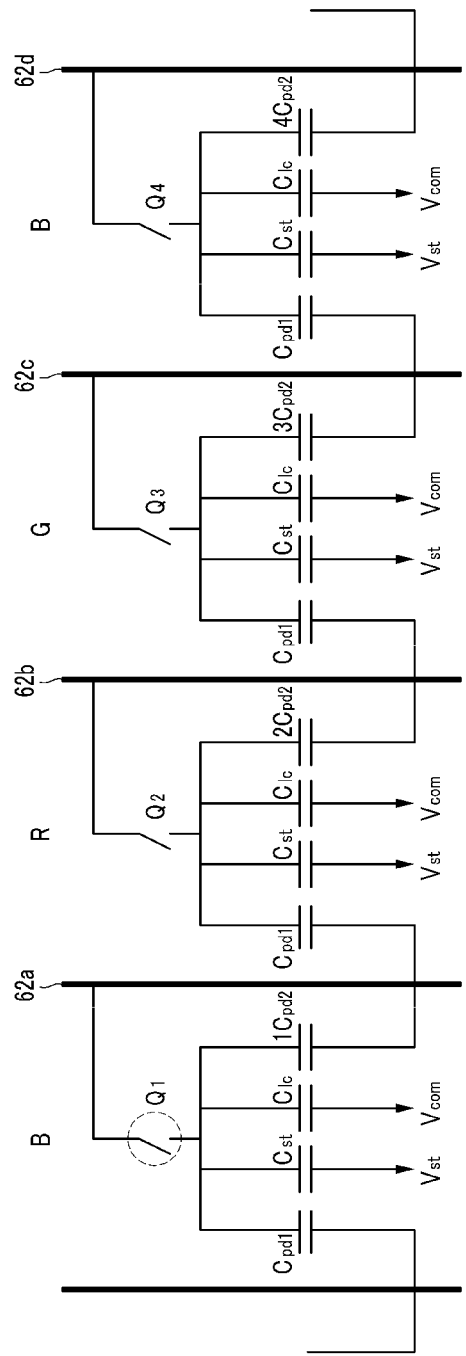
FIG. 3A is a capacitance circuit diagram of a thin film transistor array panel according to an exemplary embodiment of the present invention.

FIG. 3A is a circuit diagram representing the pixel arrangement shown in FIG. 2 and schematically shows the capacitances and the signal lines.

In FIG. 3A, the thin film transistors Q1-Q4, the capacitances Clc of the liquid crystal capacitors, and the capacitances Cst of the storage capacitors are shown. Also, the parasitic capacitances between each of the data lines 62a-62d and two of the pixel electrodes 82a-82d that are adjacent thereto are shown, and for example the parasitic capacitance between the first data line 62a and the first pixel electrode 82a is shown as Cpd2, and the parasitic capacitance between the first data line 62a and the second pixel electrode 82b is shown as Cpd1.

Figure 3B:
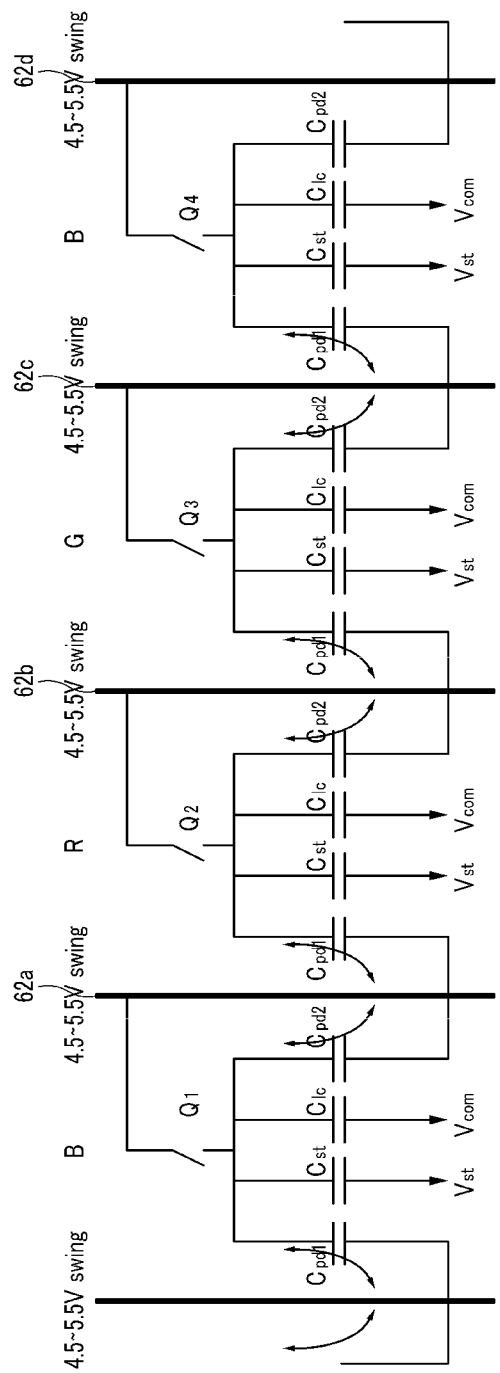
FIG. 3B is a schematic diagram for explaining capacitance of R, G, and B pixels supplied with the first data voltage in the thin film transistor array panel shown in FIG. 3A.
Figure 3C:
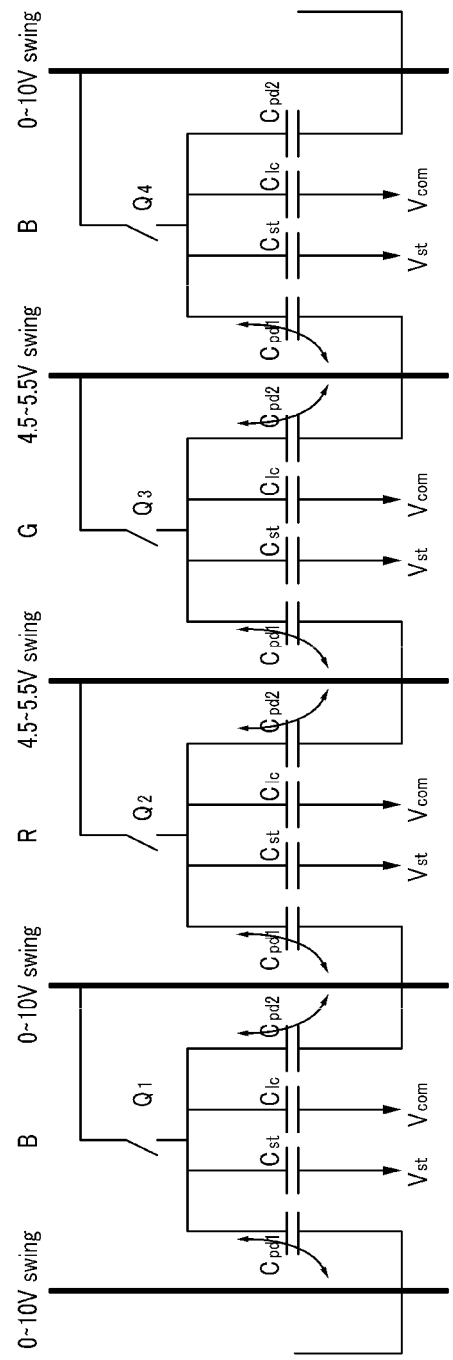
FIG. 3C is a schematic diagram for explaining capacitance of the R and G pixels supplied with the first data voltage, and the B pixel supplied with the second data voltage in the thin film transistor array panel shown in FIG. 3A.

As shown in FIG. 3B, it is considered that the first voltage is applied to all transistors Q1-Q4. For example, the voltages of 4.5 and 5.5V that are symmetrical with reference to the common voltage of 5V are alternately applied to each of the pixel electrodes 82a-82d in consideration of inversion driving. Then, the maximum voltage differences between each of the data lines 62a-62d and the neighboring pixel electrodes 82a-82d are 1V. Accordingly, the voltage shift due to the Cpd2 is almost the same as that due to Cpd1, and thus the net voltage difference due to the parasitic capacitances is small.

Meanwhile, it is considered that the entire screen displays a yellow color. The R pixel having the second pixel electrode 82b and the B pixel having the third pixel electrode 82c are supplied with the first voltage, and the B pixel having the first pixel electrode 82a and the pixel B having the fourth pixel electrode 82d are supplied with the second voltage. For instance, the B pixels having the pixel electrodes 82a and 82d are alternately supplied with the voltages of 0 and 10V that reverse relative to the common voltage of 5V. In this case, the maximum voltage difference of 1V is generated between the G pixel having the third pixel electrode 82c and the second data line 62b such that the coupling effect is small and the voltage shift due to the parasitic capacitance is small.

The second data line 62b connected to the R pixel having the second pixel electrode 82b is alternately supplied with voltages of 4.5 and 5.5V, and the first data line 62a connected to the B pixel having the first pixel electrode 82a is alternately supplied with the voltages of 0 to 10V, to display a black color. Accordingly, a maximum difference of 5.5 (10−4.5) V is generated between the first data line 62a and the second pixel electrode 82b such that the coupling effect is large and the voltage shift due to the parasitic capacitance is also large. Therefore, the voltage of the second pixel electrode 82b becomes smaller than the voltage initially supplied from the second data line 62b. Also, the load of the data IC is large.

However, the blocking electrodes 21 are disposed between the first data line 62a and the second pixel electrode 82b in an exemplary embodiment of the present invention such that the parasitic capacitance generated between the first data line 62a and the second pixel electrode 82b is decreased, thereby reducing the voltage shift due to the parasitic capacitance and thus reducing the greenish deterioration.

Figure 3D:
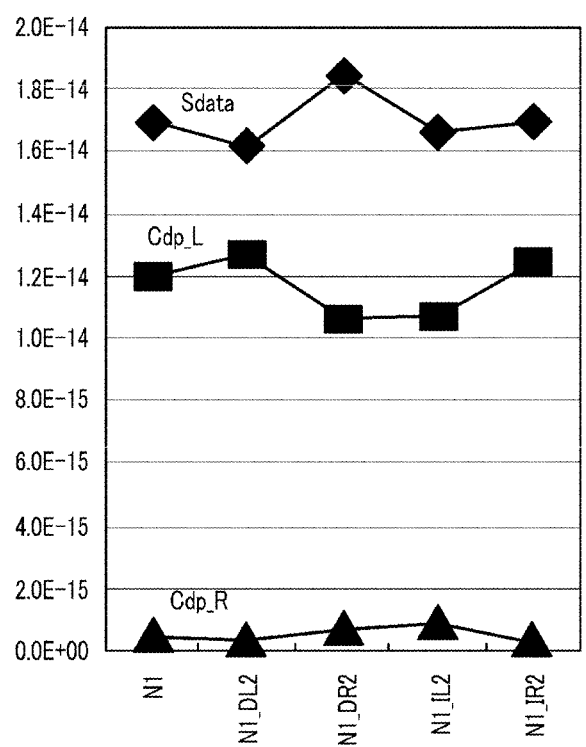
FIG. 3D is a graph showing values of parasitic capacitance obtained by simulation of an exemplary embodiment of the present invention.

FIG. 3D is a graph showing the values of the parasitic capacitance obtained by a simulation of an exemplary embodiment of the present invention. A parasitic capacitance Cdata of the first data line 62a, a parasitic capacitance Cdp_L between the first data line 62a and the first pixel electrode 82a on the first data line 62a and the parasitic capacitance Cdp_R between the first data line 62a and the second pixel electrode 82b are decreased by more than 25% from Sdata, as shown in FIG. 3D. Here, the values of Sdata are parasitic capacitances in a conventional structure without the blocking electrode 21. The variations are not large in the simulation cases of N1_DL2, N1_DR2, N1_IL2, and N1_DR2 in which 2 micrometers of a mask alignment margin between the pixel electrodes 82a-82d and the data line 62a-62d is established, differently from N1 lacking the mask alignment margin. Accordingly, the problems such as the greenish deterioration may be solved by adapting the present invention.

The above-described driving voltages, such as the voltage applied to the data lines 62a-62d, the voltages applied to the gate lines 22, and the common voltage of the common electrode 90 may be changed according to the driving types of the liquid crystal display, and the driving voltages may be changed according to the liquid crystal driving mode such as TN, PVA, IPS, and MVA.

Next, a thin film transistor array panel for a liquid crystal display and a liquid crystal display including the same according to an exemplary embodiment of the present invention will be described in detail with reference to FIGS. 4A to 4D.

Figure 4A:
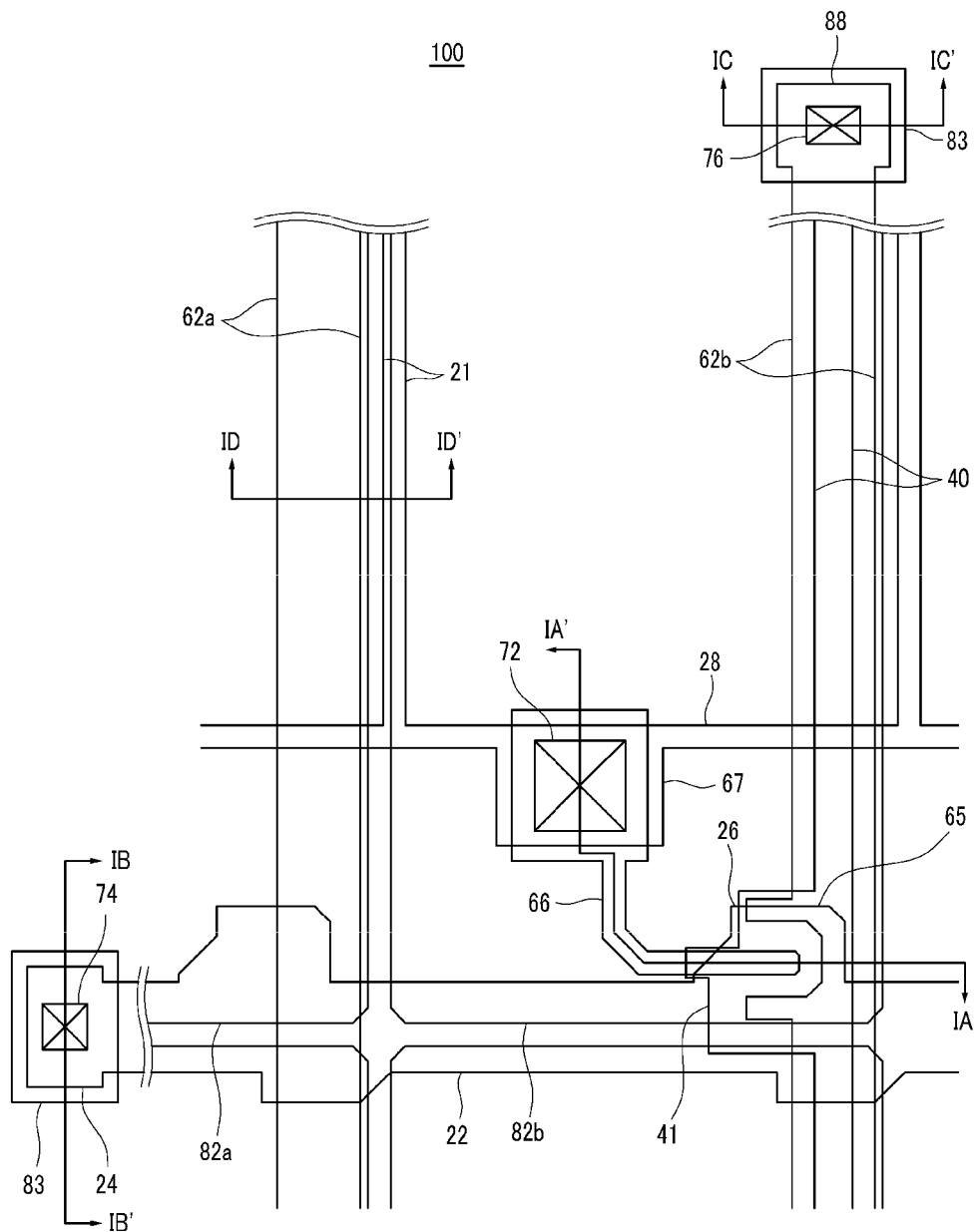
FIG. 4A is a layout view of the thin film transistor array panel for one pixel according to an exemplary embodiment of the present invention.

FIG. 4A is a plan view of a portion of a thin film transistor array panel which is indicated by reference numeral 100.

A gate line 22 is formed in the horizontal direction on an insulating substrate 10, and the gate line 22 includes a gate electrode 26 with a protrusion shape. Also, the gate line 22 includes an end portion 24 for receiving the gate signal from another layer or the outside and transmitting it through the gate line 22, and the end portion 24 of the gate line 22 is enlarged with a wide width for connection to an external circuit. The gate line 22, the gate electrode 26, and the end portion 24 together are called a gate wire.

Further, the first data line 62a and the second data line 62b are formed in the vertical direction on the insulating substrate 10, the first data line 62a is connected to the first pixel electrode 82a, and the second data line 62b is connected to the second pixel electrode 82b.

Also, a blocking electrode 21 is formed in the vertical direction on the insulating substrate 10. The blocking electrode 21 is disposed on one side of the first data line 62a to suppress the parasitic capacitance generated between the first data line 62a and the second pixel electrode 82b, and to prevent light leakage.

The blocking electrode 21 is simultaneously formed with the line 22, but may be simultaneously formed with the data line 62. Here, the data line 62 is part from the blocking electrode 21, and it is preferable that the distance between the data line 62 and the blocking electrode 21 is in the range of about from 0.5 micrometers to 4 micrometers. The parasitic capacitance between the data line 62 and the blocking electrode 21 may be sufficiently reduced by the distance such that the driving IC may not be overloaded.

The first pixel electrode 82a is disposed on the first data line 62a. Accordingly, the alignment of the liquid crystal layer is effectively generated such that the width of a black matrix is reduced, thereby obtaining a high aperture ratio.

Here, the first pixel electrode 82a may cover the first data line 62a. In this case, the first pixel electrode 82a also receives the signals provided by the first data line 62a such that a voltage difference between the two components is small to thereby minimize the generation of the parasitic capacitance. The blocking electrode 21 is disposed between the second pixel electrode 82b and the first data line 62a such that the coupling effect between the first data line 62a and the second pixel electrode 82b is reduced to thereby reduce the coupling effect. The blocking electrode 21 may overlap the second pixel electrode 82b, and it is preferable that the overlapping width is in the range of about from 0.5 to 4 micrometers.

Also, a storage electrode line 28 that is substantially parallel to the gate line 22 is formed in the horizontal direction on the insulating substrate 10. The storage electrode line 28 is simultaneously formed with the gate line 22. As shown in FIG. 4A, the blocking electrode 21 is electrically connected to the storage electrode line 28 for receiving the same electrical signal as that of the storage electrode line 28. Alternatively, blocking electrode 21 may be floated.

A gate insulating layer 30 preferably made of silicon nitride (SiNx) is formed on the gate wire 22, 24, and 26, the blocking electrode 21, and the storage electrode line 28.

A semiconductor layer 41 preferably made of hydrogenated amorphous silicon or polysilicon is formed on the gate insulating layer 30. The semiconductor layer 41 may have various shapes such as an island or line shape, and for example the semiconductor layer 41 is disposed under the data line 62 and extended on the gate electrode 26 with the line shape, as shown in the present exemplary embodiment. Also, the semiconductor layer 41 may be island-shaped on the gate electrode 26. When forming the semiconductor layer 41 with a stripe shape, the semiconductor layer 41 may be patterned along with the data line 62, and may be patterned by using an additional mask.

Ohmic contact layers 55 and 56 are preferably made of silicide, of n+ hydrogenated amorphous silicon into which an n-type impurity is doped at a high concentration, or of a semiconductor material including an n-type or p-type impurity. The ohmic contact layers 55 and 56 may have various shapes such as island and stripe shapes, and for example the ohmic contact layers 55 and 56 are disposed under the drain electrode 66 and the source electrode 65 as shown in the present exemplary embodiment, but an ohmic contact stripe may be extended under the data line 62.

A data line 62 and a drain electrode 66 are formed on the ohmic contact layers 55 and 56, and on the gate insulating layer 30. The data line 62 is extended in the vertical direction and intersects the gate line 22 to define a pixel. The data line 62 includes a source electrode 65 extended with a branch shape from the data line 62 to the upper portion of the semiconductor layer 40. Also, the data line 62 includes an end portion 68 for receiving data signals from other layers or the outside and transmitting them through the data line 62, and the end portion 68 of the data line 62 is enlarged with a wide width for connection to an external circuit.

The drain electrode 66 is separated from the source electrode 65, and the drain electrode 66 is disposed on the semiconductor layer 40 to oppose the source electrode 65 with respect to the gate electrodes 26.

The drain electrode 66 has a bar pattern, which is curved and straight, and is disposed on the semiconductor layer 40, and an expansion portion extended from the bar pattern to a contact hole 76 and having a wide area.

The data line 62, the end portion 68, the source electrode 65, the drain electrode 66, and a coupling electrode 68 together are called a data wire.

The storage electrode 67 is connected to the storage electrode line 28, and the storage capacitor includes one terminal made of the storage electrode 67, another terminal made of the drain electrode and the pixel electrode 82 electrically connected to the drain electrode, and an insulating layer 70 formed therebetween. The dielectric of the storage capacitor may further include a first passivation layer and a second passivation layer, a passivation layer of a single-layered structure, or a plurality of layers as well as the insulating layer formed therebetween.

A portion of the source electrode 65 at least overlaps the semiconductor layer 40, and the drain electrode 66 opposes the source electrode 65 with respect to the gate electrode 26 and at least overlaps the semiconductor layer 40. Here, the ohmic contact layers 55 and 56 are interposed only between the underlying semiconductor layer 40 and the overlying source and drain electrodes 65 and 66 thereon, and reduce the contact resistance therebetween.

Figure 4B:
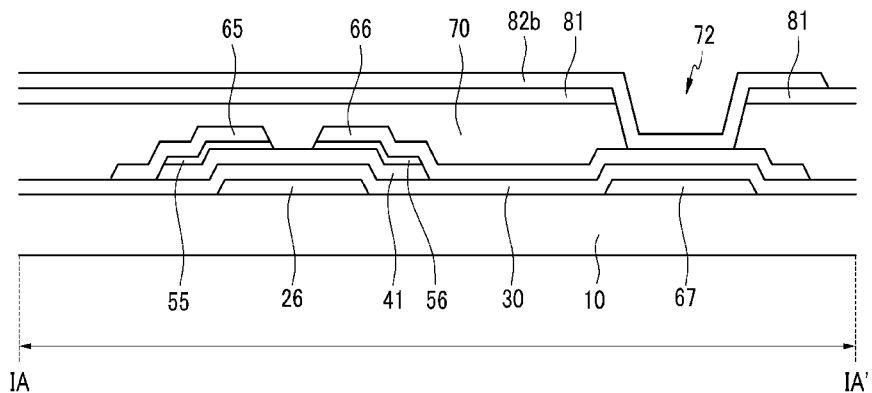
FIG. 4B is a cross-sectional view of the thin film transistor array panel shown in FIG. 4A taken along the line IA-IA'.

As illustrated, for example, in FIG. 4B, a first protecting layer 70, preferably made of the insulating layer, is formed on the data wire 62, 65, 66, and 68 and the exposed semiconductor layer 41. Here, the first protecting layer 70 is made of an inorganic material such as silicon nitride or silicon oxide, an organic material having a good planarizing characteristic and photosensitivity, or an insulating material having a low dielectric constant such as a-Si:C:O or a-Si:O:F that is formed by plasma enhanced chemical vapor deposition (PECVD). Also, a passivation layer 81, also shown in FIG. 4B, made of an organic material is formed on the first protecting layer 70 to form a protecting layer with a double-layered structure.

The first protecting layer 70 may omitted, in which case only the passivation layer 81 is formed on the thin film transistor as a passivation layer.

The first protecting layer 70 has a plurality of contact holes 72, 76, and 78 exposing the storage electrode 67, the drain electrode 66, and the end portion 68 of the data line 62, and the first protecting layer 70 and the gate insulating layer 30 include a contact hole 74 exposing the end portion 24 of the gate line 22.

A pixel electrode 82b that is electrically connected to the drain electrode 66 through the contact hole 72 and having a shape corresponding to the pixel is formed on the first protecting layer 70. The pixel electrode 82b that is supplied with the data voltage and the common electrode of the upper panel generate an electric field, which determines orientations of liquid crystal molecules of the liquid crystal layer between the pixel electrode and the common electrode.

Also, contact assistants 76 and 88 respectively connected to the end 24 of the gate line 22 and the end 68 of the data line 62 through the contact holes 74 and 78 are formed on the first protecting layer 70 and the insulating layer. Also, the first protecting layer 70 and insulating layer include a plurality of contact holes 71 and 72 exposing the storage electrode line 28 and the storage electrode 67, and a connecting member 83 for connecting the storage electrode line 28 and the storage electrode 67 to each other through the contact holes 71 and 72 is formed the first protecting layer 70.

Here, the pixel electrode 82b, the contact assistants 76 and 88, and the connecting member 83 are made of a transparent conductor such as ITO or IZO or a reflective conductor such as aluminum. The contact assistants 86 and 88 function to ensure connection between an external device and the ends 24 and 68 of the gate line 22 and the data line 62. An alignment layer (not shown) for aligning the liquid crystal molecules of the liquid crystal layer may be formed on the pixel electrode 82, the contact assistants 86 and 88, and the first protecting layer 70.

FIG. 4B is a cross-sectional view of FIG. 4A taken along with the line IA-IA'. The gate insulating layer 30 is interposed between the gate electrode 26, and the source electrode 65 and drain electrode 66, and the semiconductor layers 40 and 41 are formed on the gate electrode 26. The source electrode 65 and the drain electrode 66 are separated from each other, the first protecting layer 70 is disposed on the source electrode 65, the semiconductor layer 40, and the drain electrode 66, and the storage electrode 67 is disposed under the drain electrode 66.

The drain electrode 66, the storage electrode 67 under the drain electrode 66, and the insulating layer therebetween form the storage capacitor. Also, the pixel electrode 82b and the drain electrode 66 are connected to each other through the contact hole 72 disposed on the drain electrode 66 such that a signal applied to the data line 62 is transmitted to the pixel electrode 82 through the drain electrode 66 to the signal applied to the gate line 22. The drain electrode 66 simultaneously functions as an electrode for forming a storage capacitance such that the aperture ratio is improved.

Figure 4C:
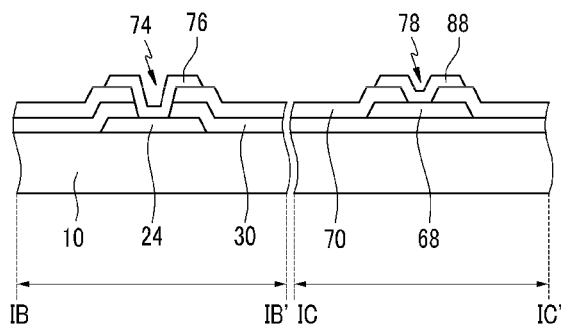
FIG. 4C a cross-sectional view of the thin film transistor array panel shown in FIG. 4A taken along the lines IB-IB' and IC-IC'.

FIG. 4C is a cross-sectional view of pad portions of the gate line 22 and the data line 62, respectively. The pad portion of the gate line 22 is disposed under the first protecting layer 70 and the insulating layer, and is electrically connected to the contact assistant through the contact hole for ohmic contact of the gate line 22. The pad portion of the data line 62 is disposed under the first protecting layer 70, and is electrically connected to the contact assistant through the contact hole for ohmic contact of the data line 62.

Figure 4D:
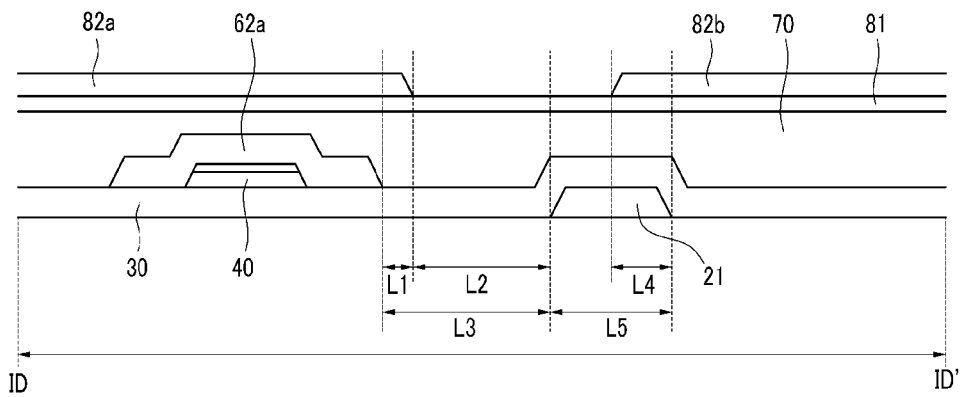
FIG. 4D a cross-sectional view of the thin film transistor array panel shown in FIG. 4A taken along the line ID-ID'.

FIG. 4D is a cross-sectional view of FIG. 4A taken along with the line ID-ID'. The gate insulating layer 30 is formed on the blocking electrode 21, and the data line 62a is disposed on the gate insulating layer 30.

The first protecting layer 70 is formed on the gate insulating layer 30. A passivation layer may be selectively formed on the first protecting layer, and the pixel electrode is formed thereon. The first data line 62a and the blocking electrode 21 are separated from each other by the distance L3, and an overlapping region does not exist. Accordingly, the load between the data line and the blocking electrode 21 is reduced and the parasitic capacitance is reduced to thereby reduce the load of the data IC. To obtain this, it is preferable that the distance L3 between the data line 62 the blocking electrode 21 is in the range of about 0.5 to 4 micrometers. When the distance is increased, the aperture ratio is reduced. Accordingly, it is necessary to maintain the optimized distance to minimize the reduction of the aperture ratio and to reduce the parasitic capacitance.

The first pixel electrode 82a overlaps at least a portion of the first data line 62a, and it is advantageous to completely cover the first data line 62a. Here, it is preferable that the distance L1 between the end edge of the first pixel electrode 82a and the end edge of the first data line 62a is in the range of about 0.5 to 6 micrometers. An organic insulator of the passivation layer 81 that is disposed on the first protecting layer 70 for reducing the parasitic capacitance generated between the pixel electrode 82 and the data line 62 may be additional formed. Here, the passivation layer 81 is made of a low dielectric organic material, and the first protecting layer 70 may be omitted. When additional forming the passivation layer 81, the passivation layer 81 must include a plurality of contact holes exposing the gate line 22, the data line 62, and the drain electrode 66. Here, the passivation layer 81, the first protecting layer 70, and the insulating layer 30 are patterned by using one mask process such that an additional mask is not needed. Also, when forming the passivation 81 of an organic material, the first protecting layer 70 and the gate insulating layer 30 are etched by using the passivation layer 81 as an etch mask to form the contact holes such that an additional photolithography process may be omitted. The second pixel electrode 82b overlapping the blocking electrode 21 is disposed on the blocking electrode 21, and it is preferable that the overlapping width L4 thereof is in the range of about 0.5 to 6 micrometers.

Figure 5:
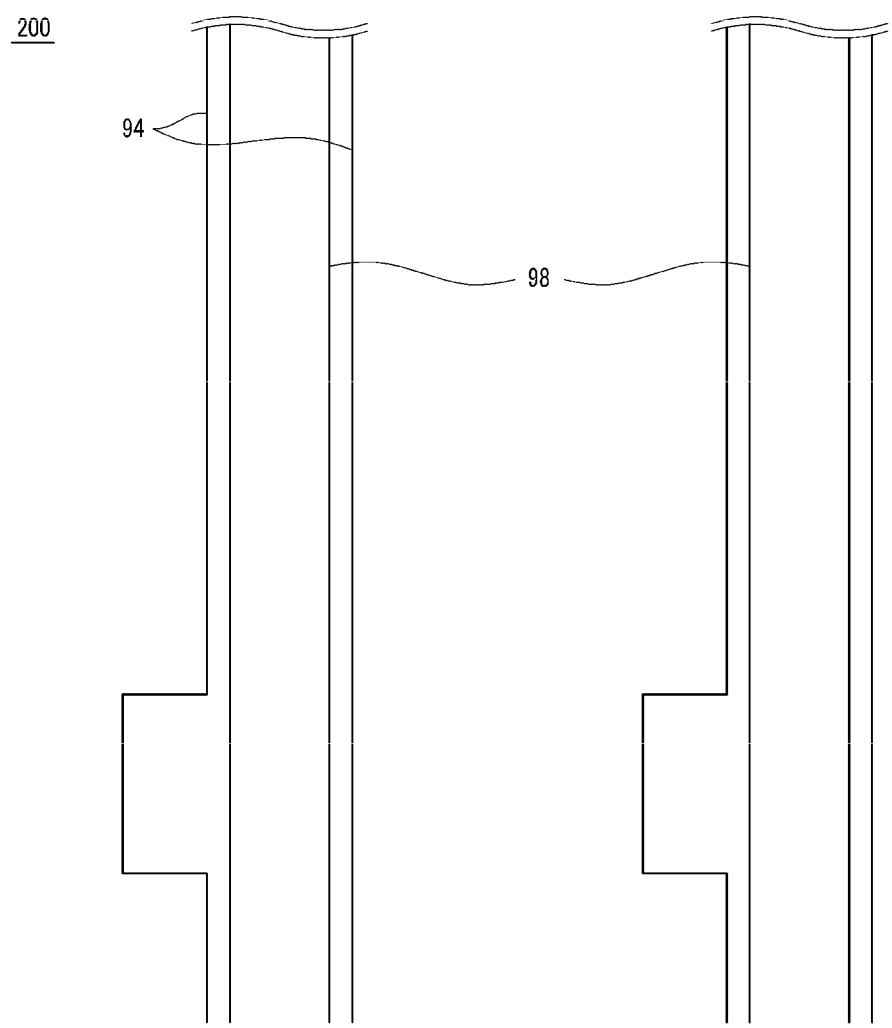
FIG. 5 is a layout view of a color filter array panel for a liquid crystal display including a common electrode and a black matrix according to an exemplary embodiment of the present invention.

FIG. 5 is a layout view of a common electrode panel for a liquid crystal display according to an exemplary embodiment of the present invention. The common electrode panel includes a color filter 98, a common electrode 90, and a black matrix 94.

Figure 6A:
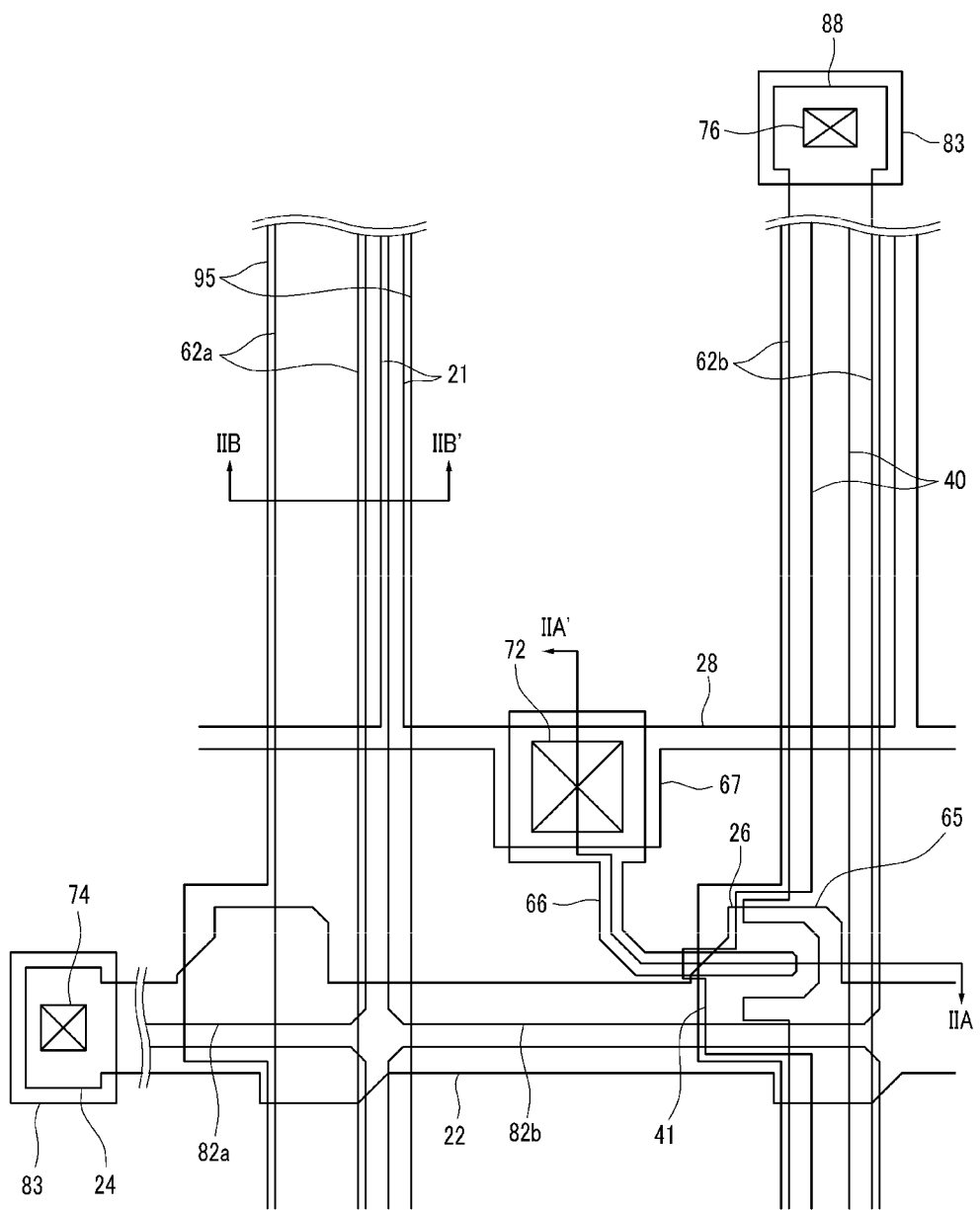
FIG. 6A is a layout view of the liquid crystal display including a color filter array panel.
Figure 6B:
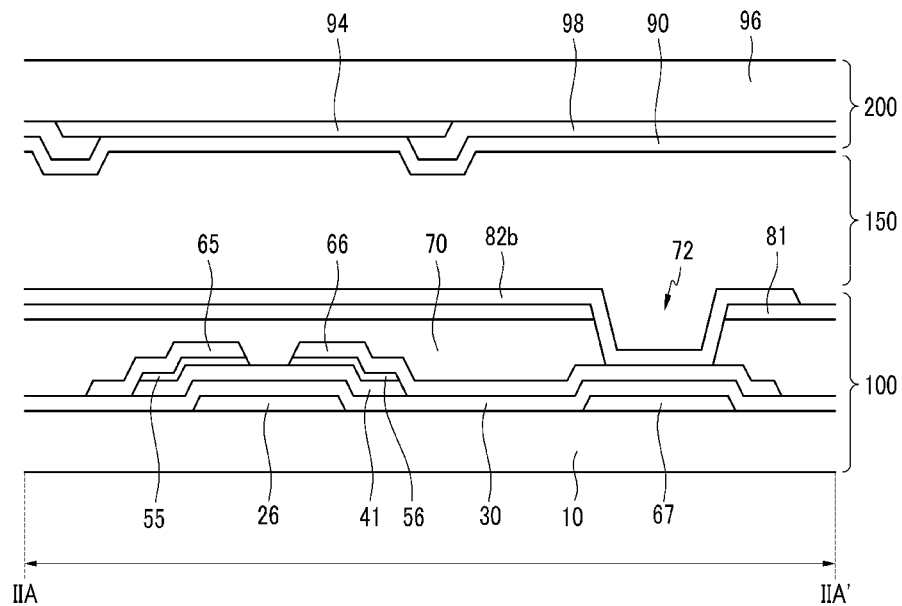
FIG. 6B is a cross-sectional view of the liquid crystal display shown in FIG. 6A taken along the line IIA-IIA'.

FIG. 6A is a layout view of a liquid crystal display including the thin film transistor array panel of FIG. 4A and the common electrode panel of FIG. 5. FIG. 6B is a cross-sectional view of the liquid crystal display shown in FIG. 6A taken along with the line IIa-IIa', and FIG. 6C is a cross-sectional view of the liquid crystal display shown in FIG. 6A taken along with the line IIB-IIB'.

Figure 6C:
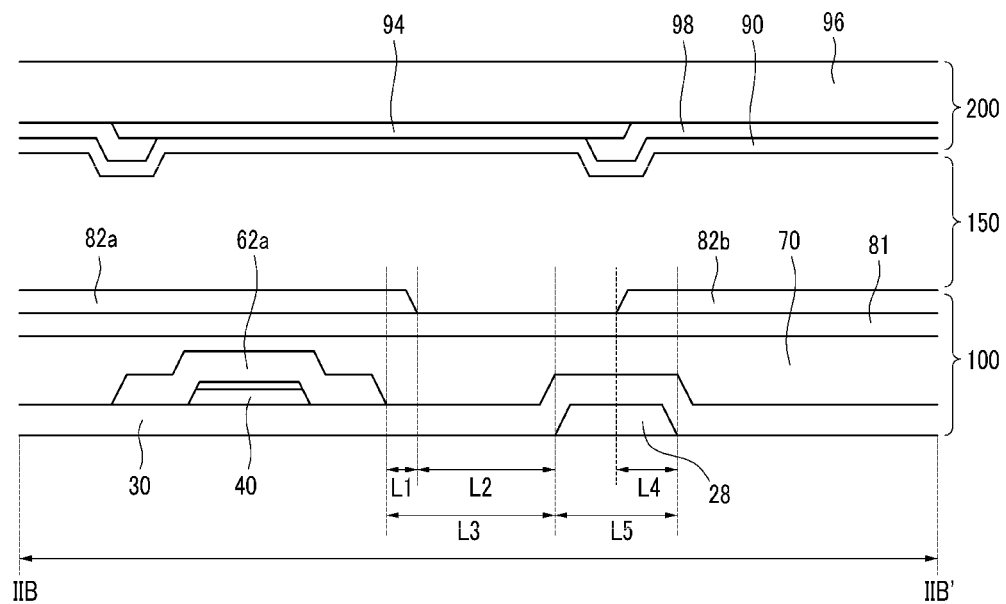
FIG. 6C is a cross-sectional view of the liquid crystal display shown in FIG. 6A taken along the line IIB-IIB'.

Referring to FIGS. 5 to 6C, the black matrix 94 for preventing light leakage is formed on an insulating substrate 96 preferably made of a transparent insulating material such as glass, color filters 98 of red, green, and blue are sequentially arranged in pixels, and a common electrode 90 preferably made of a transparent conductive material such as ITO or IZO is formed on the color filters 98. An alignment layer (not shown) for aligning the liquid crystal molecules may be coated on the common electrode 90.

As shown in FIG. 6B, the thin film transistor array panel 200 and common electrode panel 100 are aligned and combined, a liquid crystal layer 150 is formed therebetween, and liquid crystal molecules of the liquid crystal layer 150 are vertically aligned to complete the base structure of the liquid crystal display according to an exemplary embodiment of the present invention.

The liquid crystal molecules of the liquid crystal layer 150 are vertically aligned to be perpendicular to the thin film transistor array panel 100 and the common electrode panel 200 in a state where an electric field is not applied between the pixel electrodes 82 and the common electrode 90, and have negative dielectric anisotropy. The thin film transistor array panel 100 and the common electrode panel 200 are aligned such that the pixel electrode 82 and the color filter 98 face each other and are correctly overlapped.

The liquid crystal display may include elements such as polarizers and a backlight in the base structure. Here, the polarizers (not shown) may be respectively disposed on opposite sides of the base structure, and one transmissive axis thereof is parallel to the gate lines 22 and the other transmissive axis thereof is perpendicular to the gate line 22.

Referring to FIGS. 6A and 6C, the blocking electrode 21 is formed with one side of the data line 62 on the insulating substrate 10. As above-described, the blocking electrode 21 prevents light leakage that is generated on the circumferences of the first data line 62 and the second pixel electrode 82b.

Generally, the liquid crystal molecules disposed on the circumference of the data line 62 are not controlled by the pixel electrode 82 and the common electrode 90 such that the light leakage is generated, and the light leakage becomes greater near the backlight (not shown), and passes to the space between the data line 62 and the pixel electrode 82. Furthermore, the light from the backlight is incident at various angles and passes such that the black matrix 94 having the wide area is needed to prevent the light leakage.

However, the light leakage between the first data line 62a and the first pixel electrode 82a is prevented by disposing the first pixel electrode 82a on the first data 62a to control the liquid crystal molecules in the liquid crystal display according to the present invention. Also, the light leakage between the first data line 62a and the second pixel electrode 82b is prevented by using the blocking electrode 21 that reduces the parasitic capacitance generated between the first data line 62a and the second pixel electrode 82b to block the space between the first data line 62a and the second pixel electrode 82b. Accordingly, the area of the black matrix 94 on the first data line 62a may be reduced, thereby improving the aperture ratio of the liquid crystal display. This may also be adapted to the black matrix 94 disposed on the second data line 62b.

Figure 7A:
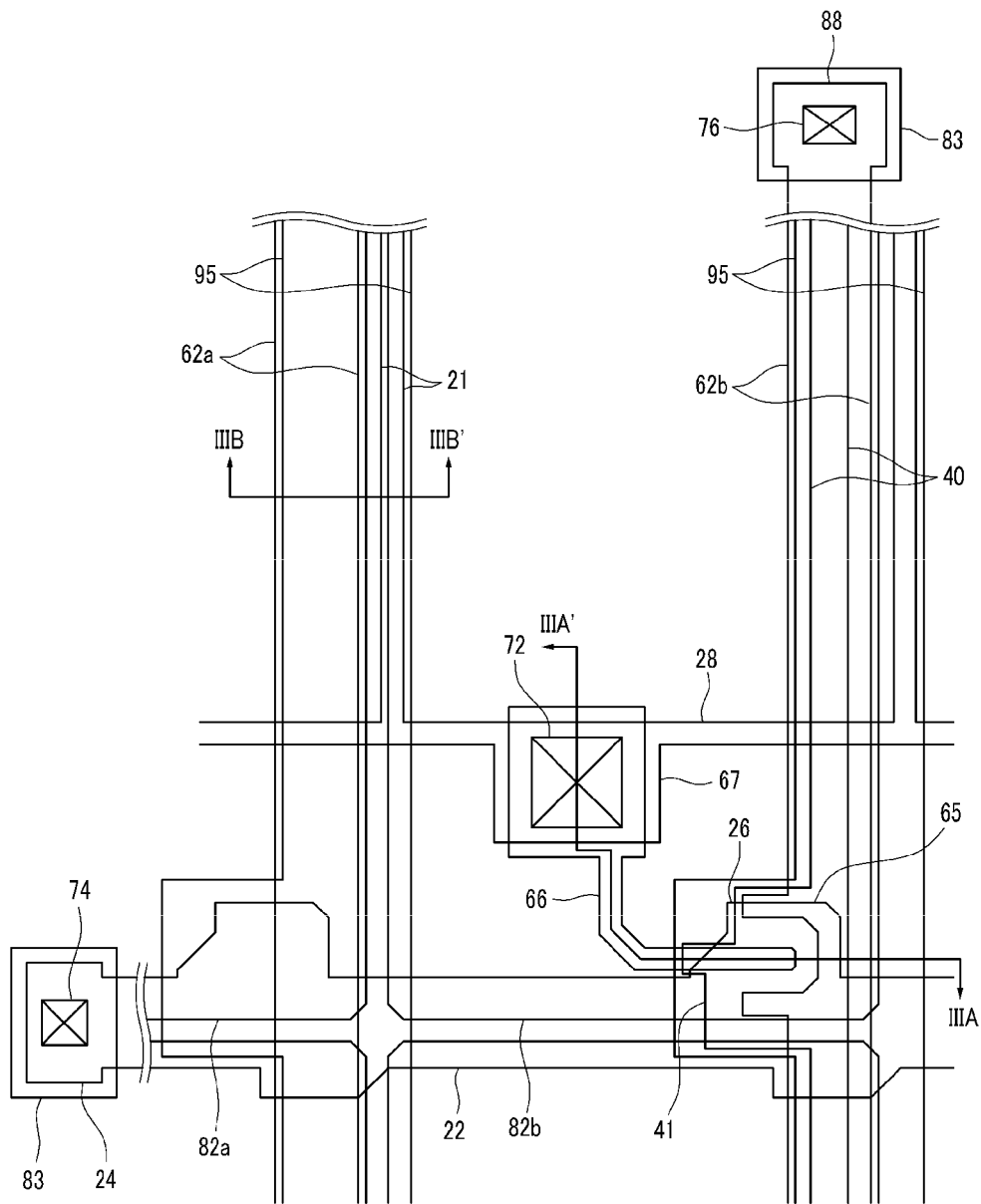
FIG. 7A is a layout view of a thin film transistor array panel according to an exemplary embodiment of the present invention.

FIG. 7A is a layout view of a thin film transistor array panel according to an exemplary embodiment of the present invention. The same constituent elements in exemplary embodiments of the present invention indicate the same reference numerals, and different characteristics from the previous embodiment will be additional explained in detail.

Figure 7B:
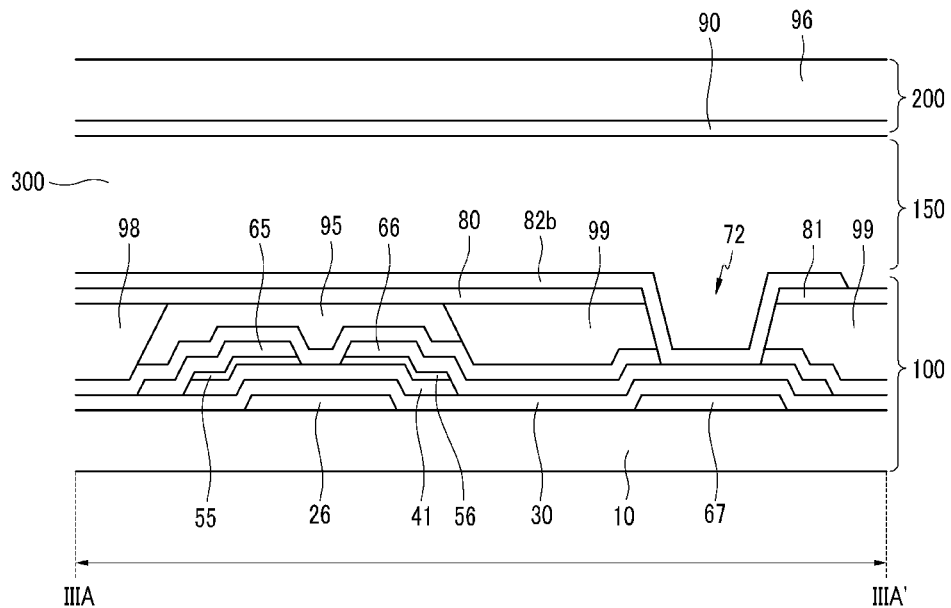
FIG. 7B is a cross-sectional view of the thin film transistor array panel shown in FIG. 7A taken along the line IIIA-IIIA'.

As shown in FIG. 7B, color filters 99 are formed on the first protecting layer 70. The color filters 99 represent one of three primary of red, green, and blue, and are partially overlapped with each other between the pixels.

A second protecting layer 80 is formed on the color filters 99. The second protecting layer 80 prevents impurities of the color filters 99 from flowing into the liquid crystal layer.

Also, a black matrix 95 is formed according to the data line 62 on the substrate including thin film transistors. Further, the black matrix is formed to prevent the current characteristic of the thin film transistors from deteriorating due to the light incident to the thin film transistors through the thin film transistor array panel 100 or the common electrode panel 200. Accordingly, only a common electrode 90 is formed on the common electrode panel 200. The black matrix 95 may be disposed on or under the second protecting layer 80.

FIG. 7B is a cross-sectional view of FIG. 7A taken along the line IIIA-IIIA'. The first protecting layer 70 is disposed on the thin film transistors, and the black matrix 95 is disposed on the first protecting layer 70.

To planarize the structure, it is preferable that the boundaries of the color filters 99 meet the boundaries of the black matrix 95. Of course, the color filters 99 may be formed on the black matrix 95.

Figure 7C:
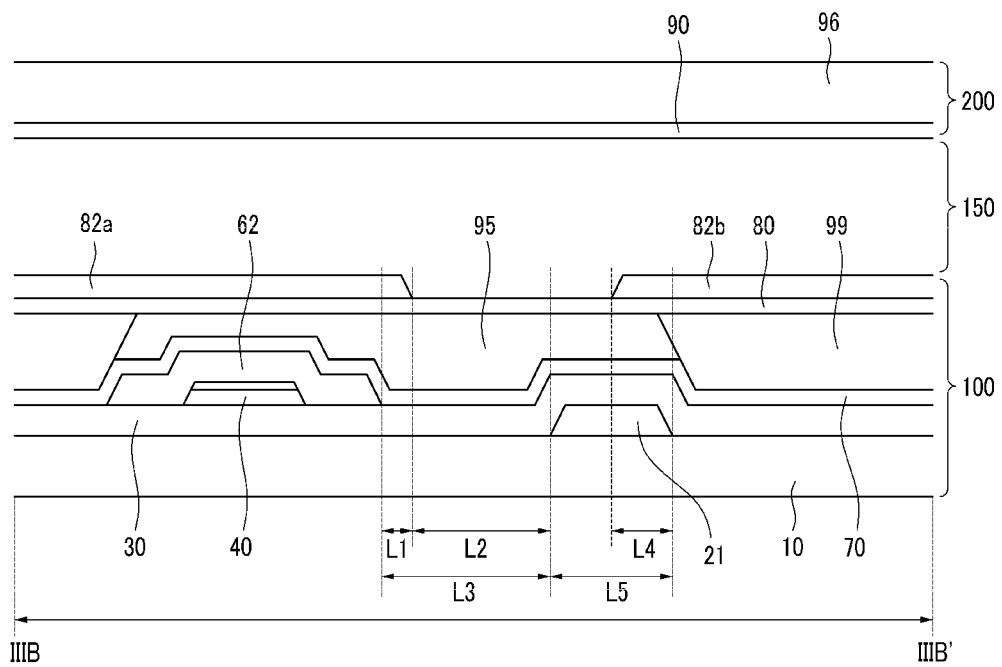
FIG. 7C is a cross-sectional view of the thin film transistor array panel shown in FIG. 7A taken along the line IIIb-IIIb'.

FIG. 7C is a cross-sectional view FIG. 7A taken along the line IIIb-IIIb'. The blocking electrode 21 is apart from the first data line 62a by the distance L3, the fist protecting layer 70 is disposed on the first data line 62a, and the black matrix 95 is formed on the first protecting layer 70. The boundaries of the color filters 99 meet the boundaries of the black matrix 95, and the color filters 99 correspond to the pixel electrodes. The first pixel electrode 82a and the second pixel electrode 82b are formed on the color filters 99. The blocking electrode 21 reduces the parasitic capacitance generated between the second pixel electrode 82b and the first data line 62a, thereby reducing the load of the data wire. Particularly, because the color filters 99 are interposed between the first data wire 62a and the first pixel electrode 82a, the parasitic capacitance may be further reduced.

Figure 8:
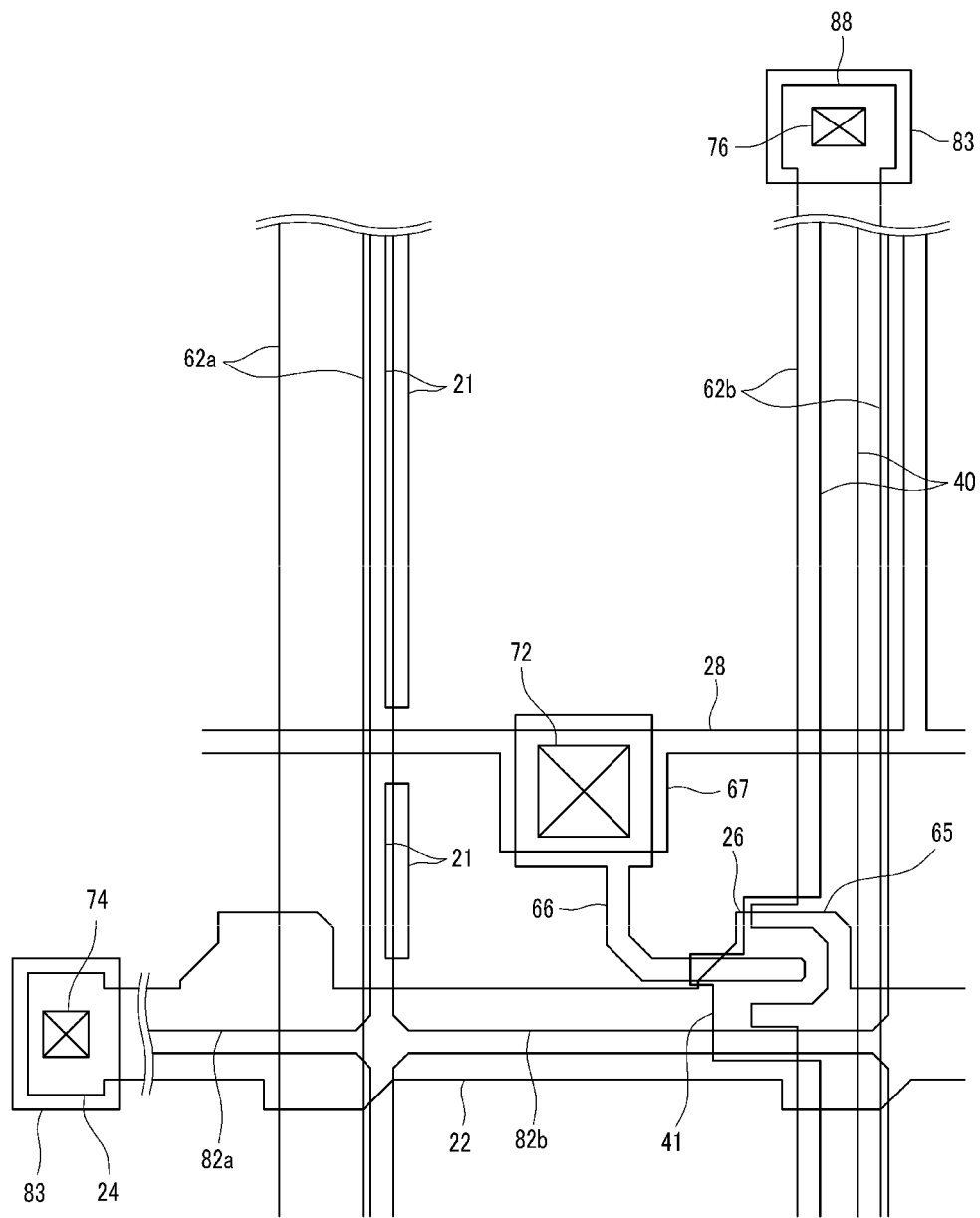
FIG. 8 is a layout view of a thin film transistor array panel according to an exemplary embodiment of the present invention.

FIG. 8 is a layout view of a thin film transistor array panel 100 according to another exemplary embodiment of the present invention. A blocking electrode 21 is electrically floated, and is simultaneously formed with a gate line 22. The rest of the elements are the same as the above-described elements.

Figure 9A:
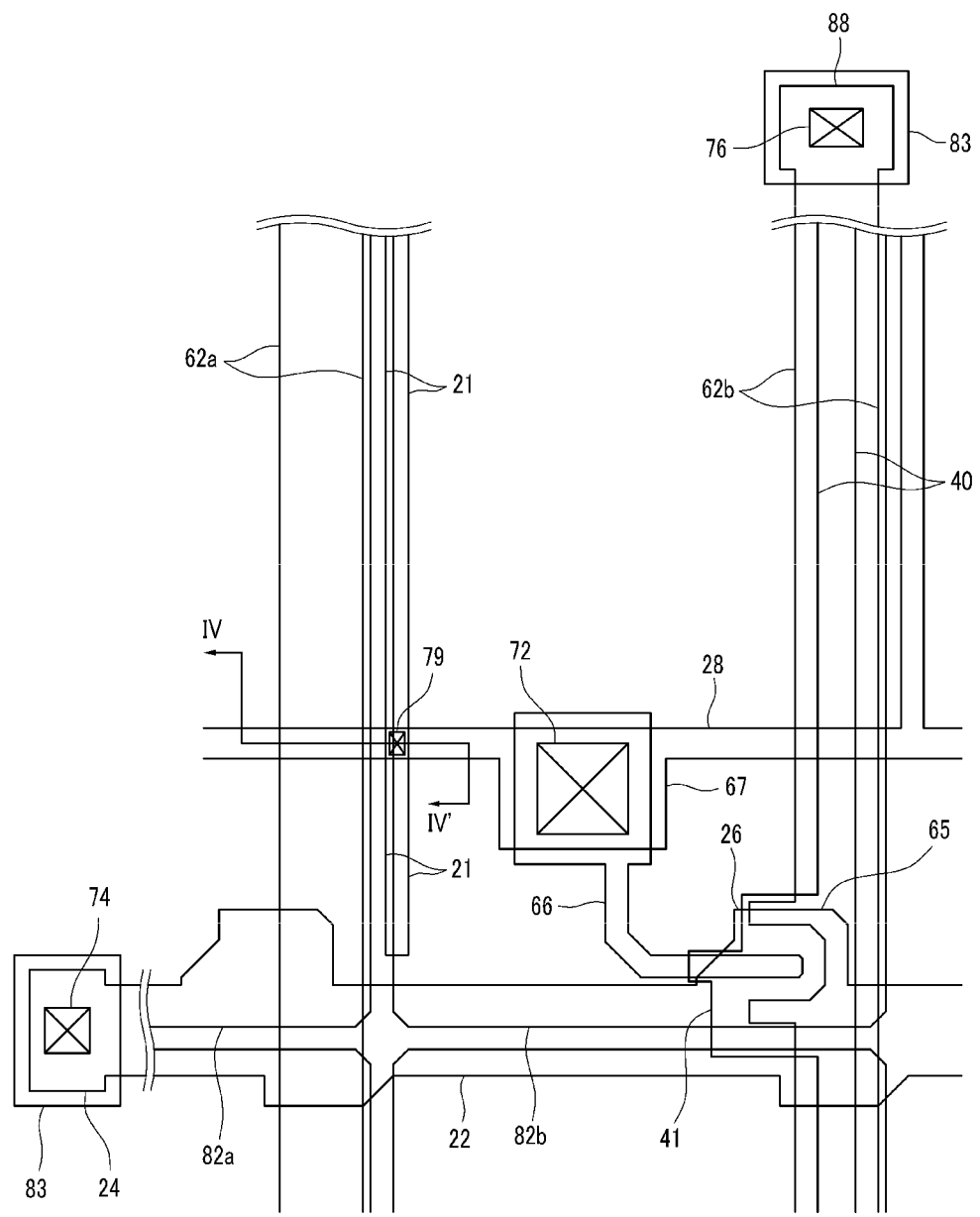
FIG. 9A is a layout view of a thin film transistor array panel according to an exemplary embodiment of the present invention.

FIG. 9A is a layout view of a thin film transistor array panel 100 according to another exemplary embodiment of the present invention.

A blocking electrode 21 is connected to a storage electrode line 28 through a fourth contact hole 79, and is simultaneously formed with the data line 62. Here, a new mask may be used to form the third contact hole 76. The rest of the elements are the same as the above-described elements.

Figure 9B:
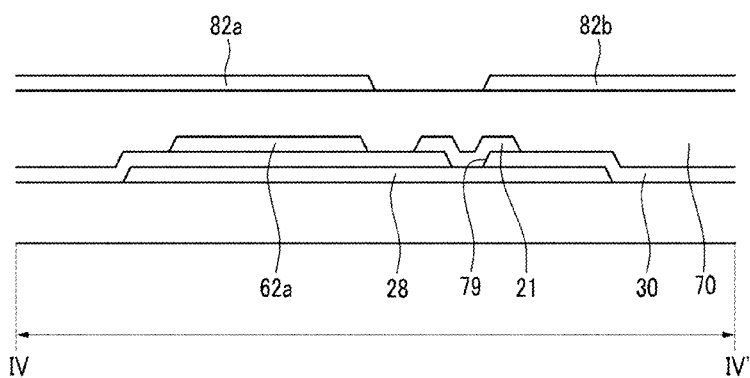
FIG. 9B is a cross-sectional view of the thin film transistor array panel shown in FIG. 9A taken along the line IV-IV'.

FIG. 9B is a cross-sectional view of FIG. 9A taken along the line IV-IV'.

The blocking electrode 21 is connected to the storage electrode line through the fourth contact hole 79, and the rest of the elements are the same as in the previously described embodiment.

Figure 10:
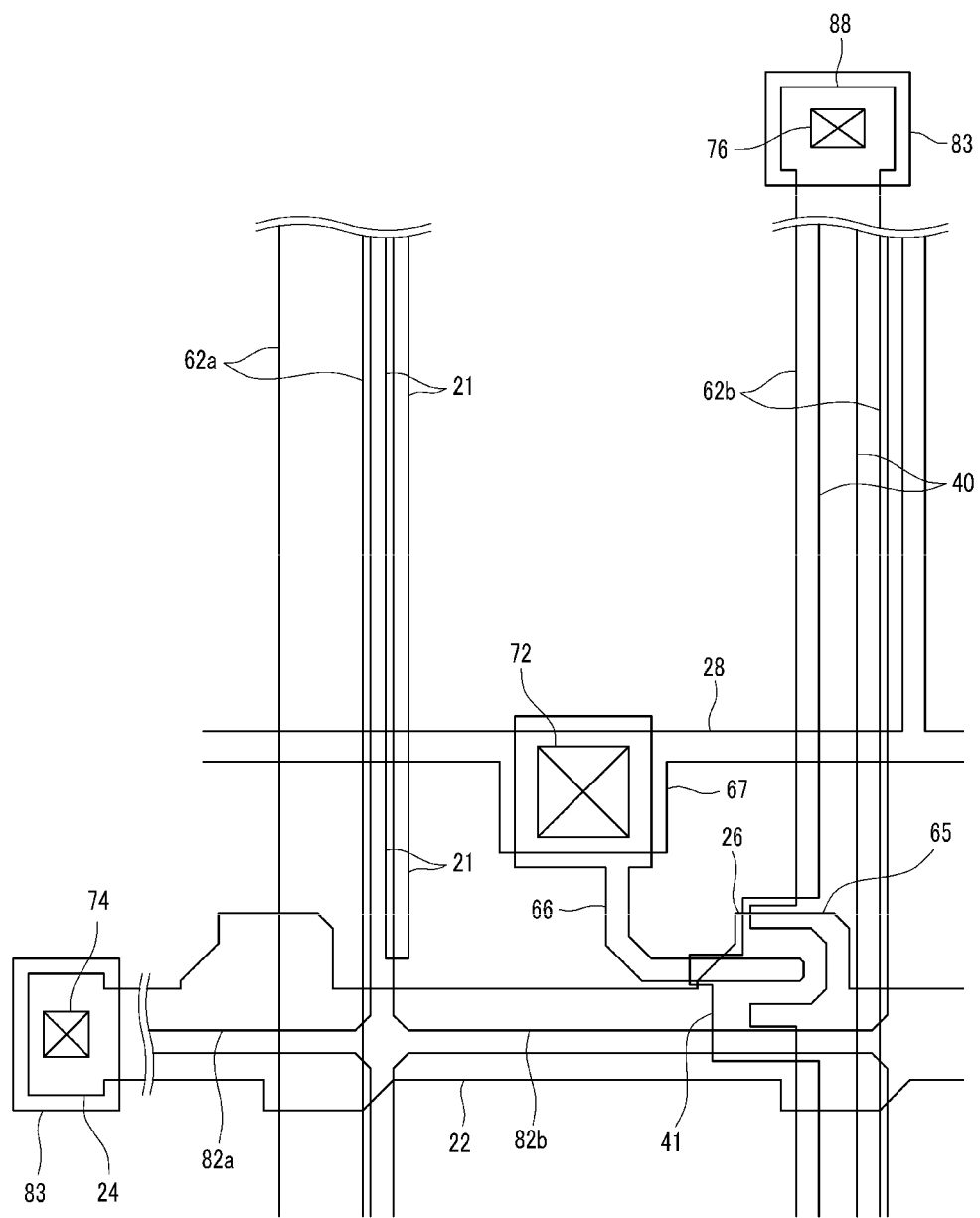
FIG. 10 is a layout view of a thin film transistor array panel according to an exemplary embodiment of the present invention.

FIG. 10 is a layout view of a thin film transistor array panel 100 according to another exemplary embodiment of the present invention.

The blocking electrode 21 is electrically floated, and is at the same layer as the data line 62. The rest of the elements are the same as the above-described elements.

As above-described, according to the liquid crystal display of the present invention, the storage electrode line 28 is used for forming the storage capacitor such that the load of the gate line 22 may be reduced. Furthermore, the area of the storage electrode connected to the storage electrode line 28 is reduced such that the aperture ratio may be improved under the formation of the same storage capacitance. Also, the light leakage at the edges of the data line is suppressed such that the area of the black matrix disposed on the data line may be decreased, thereby improving the aperture ratio.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device comprising:
a gate line formed on a substrate;
a storage electrode line formed on the substrate and spaced apart from the gate line;
a first data line and a second data line that are insulated from the gate line and the storage electrode line, the first data line and the second data line neighboring each other and intersecting the gate line;
a first thin film transistor connected to the gate line and the first data line;
a second thin film transistor connected to the gate line and the second data line;
a first pixel electrode disposed on the first data line and connected to the first thin film transistor;
a second pixel electrode disposed on the second data line and connected to the second thin film transistor; and
a blocking electrode neighboring and extending along the first data line and spaced apart from the first data line in a planar view,
wherein at least a portion of the first data line overlaps the first pixel electrode, and at least a portion of the blocking electrode overlaps the second pixel electrode, and the storage electrode line overlaps the first pixel electrode via an insulating layer to form a capacitor.

2. The display device of claim 1, wherein
the first data line is positioned such that in an area where the first pixel overlaps the first data line a full width of the data line is covered by the first pixel electrode.

3. The display device of claim 1, wherein
the blocking electrode is disposed at a different layer from the first and the second data lines.

4. The display device of claim 3, wherein
the blocking electrode is electrically connected to the storage electrode line.

5. The display device of claim 1, wherein
the blocking electrode is disposed at the same layer as the gate line.

6. The display device of claim 2, wherein
in the overlap area an edge of the pixel electrode extends beyond an edge of the first data line by a distance of from about 0.5 to about 6 micrometers.

7. The display device of claim 1, wherein
a distance between an edge of the first data line and an adjacent edge of the blocking electrode is in the range of from about 0.5 to about 6 micrometers.

8. The display device of claim 1, further comprising
an insulating layer disposed between the first and the second data lines and the blocking electrode.

9. The display device of claim 8, further comprising
a first protecting layer disposed between the first pixel electrode and the first and the second data lines.

10. The display device of claim 9, wherein
the first protecting layer comprises at least one layer and the at least one layer comprises SiO2, SiNx, or SiON.

11. The display device of claim 9, further comprising:
a passivation layer disposed between the first protecting layer and the first pixel electrode.

12. The display device of claim 11, wherein
the passivation layer comprises an organic material.

13. The display device of claim 12, wherein
the passivation layer comprises a pigment.

14. The display device of claim 13, wherein
the pigment of the passivation layer is one of red, green, and blue.

15. The display device of claim 13, further comprising
a second protecting layer disposed on the passivation layer.

16. The display device of claim 13, further comprising
a light blocking member disposed on the first and second thin film transistors.

17. The display device of claim 15, wherein
the second protecting layer comprises at least one layer and the at least one layer comprises SiO2, SiNx, or SiON.

18. The display device of claim 2, wherein
the blocking electrode is disposed at the same layer as the first and the second data lines.

19. The display device of claim 18, wherein
the blocking electrode is made of the same material as the first and the second data lines.

20. The display device of claim 2, wherein
the blocking electrode is electrically floated.

21. The display device of claim 1, wherein
the first pixel electrode and the second pixel electrode are supplied with different electric signals.

22. The display device of claim 1, wherein
an edge of the blocking electrode is substantially parallel to an edge of the first and the second data lines and the first pixel electrode.

23. The display device of claim 1, further comprising
a liquid crystal disposed on the substrate.

* * * * *